(12) United States Patent
Eiriksson

(10) Patent No.: US 9,684,597 B1
(45) Date of Patent: Jun. 20, 2017

(54) DISTRIBUTED CACHE COHERENT SHARED MEMORY CONTROLLER INTEGRATED WITH A PROTOCOL OFFLOAD NETWORK INTERFACE CARD

(71) Applicant: Chelsio Communications, Inc., Sunnyvale, CA (US)

(72) Inventor: Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 65 days.

(21) Appl. No.: 14/454,564

(22) Filed: Aug. 7, 2014

(51) Int. Cl.
  *G06F 12/0817* (2016.01)
  *G06F 12/0815* (2016.01)

(52) U.S. Cl.
  CPC ........ *G06F 12/082* (2013.01); *G06F 12/0815* (2013.01); *G06F 2212/622* (2013.01)

(58) Field of Classification Search
  CPC .. G06F 3/067; G06F 12/0806; G06F 12/0815; G06F 13/12; G06F 13/122; G06F 2212/62
  See application file for complete search history.

(56) References Cited

U.S. PATENT DOCUMENTS

| | | | |
|---|---|---|---|
| 6,438,653 B1 * | 8/2002 | Akashi | G06F 12/0831 711/128 |
| 7,835,380 B1 * | 11/2010 | Aloni | H04L 12/40032 370/394 |
| 8,155,001 B1 | 4/2012 | Eiriksson et al. | |
| 8,880,487 B1 * | 11/2014 | Clinton | H04L 67/10 707/703 |
| 2002/0083275 A1 * | 6/2002 | Kawamoto | G06F 12/0817 711/145 |

(Continued)

OTHER PUBLICATIONS

Laudon et al., "*The SGI Origin*: A ccNUMA Highly Scalable Server", Computer Architecture, 1997. Conference Proceedings. The 24th Annual International Symposium on, Jun. 2-4, 1997, pp. 241-251.

(Continued)

*Primary Examiner* — Hal Schnee
(74) *Attorney, Agent, or Firm* — Beyer Law Group LLP

(57) ABSTRACT

Network interface circuitry forms a local node. At least one processor offloads from a host computer at least one stateful communication connection between the host computer and a peer, and also operates a cache coherence protocol to scale coherent memory to multiple nodes. The processor operates the communication protocol processing offload at least in part according to communication connection states maintained in the memory, including accessing each communication connection state in the memory using the access procedure, to access that communication connection state in the memory according to an identifier corresponding to that communication connection state. The processor further operates the cache coherence protocol at least in part according to coherence states maintained in the memory, including accessing each coherence state in the memory using the access procedure, to access that coherence state in the memory according to an identifier corresponding to that coherence state.

17 Claims, 5 Drawing Sheets

(56) References Cited

U.S. PATENT DOCUMENTS

| | | | |
|---|---|---|---|
| 2006/0282645 A1* | 12/2006 | Tsien | G06F 12/1027 |
| | | | 711/207 |
| 2007/0156980 A1* | 7/2007 | Nayyar | G06F 12/0831 |
| | | | 711/158 |
| 2009/0187716 A1* | 7/2009 | Comparan | G06F 12/0833 |
| | | | 711/141 |
| 2011/0231615 A1* | 9/2011 | Ober | G06F 12/0868 |
| | | | 711/142 |
| 2014/0379836 A1* | 12/2014 | Zilberboim | G06F 11/20 |
| | | | 709/213 |
| 2015/0154341 A1* | 6/2015 | Ikram | G06F 15/78 |
| | | | 716/111 |
| 2015/0205722 A1* | 7/2015 | Chiu | G06F 11/2043 |
| | | | 714/4.11 |
| 2015/0269116 A1* | 9/2015 | Raikin | B01D 53/9418 |
| | | | 709/212 |

OTHER PUBLICATIONS

Eiríksson et al, "*Using Formal Verification/Analysis Methods on the Critical Path in System Design*: A Case Study", Proceedings of the 7th International Conference on Computer Aided Verification, pp. 367-380, Springer-Verlag London, Uk, 1995.

* cited by examiner

DISTRIBUTED CACHE COHERENT SHARED MEMORY CONTROLLER INTEGRATED WITH A PROTOCOL OFFLOAD NETWORK INTERFACE CARD

TECHNICAL FIELD

The present invention relates to a Distributed Shared Memory (DSM) controller within a protocol offload network controller to implement a Cache Coherence Shared Non-Uniform Memory (ccNUMA) fabric with the DSM controller supporting, for example, processor, IO, fetch-and-op, and block transfer operations.

BACKGROUND

A Network Interface Controller (NIC)—which may be, for example, network interface circuitry, such as within a system on a chip (SoC)—is typically used to couple one or more processors to a packet network through at least one interface, called a port. NIC circuitry has been an area of rapid development as advanced packet processing functionality and protocol offload have become common for so called "smart NICs".

Parallel computer systems provide economic, scalable, and high-availability approaches to computing solutions. From the point of view of managing computer systems including parallel-processor systems, there is a need for a cache coherence system and control in order to obtain the desired system operation. Cache coherence typically offers savings in programmers' time and leads to more robust applications, and quicker time to solution. Conventional hierarchical cache systems provide small fast cache memories physically near fast information processing units, and larger slower memories that are further away in time and space. It is too expensive to make a fast memory large enough to hold all of the data for a large computer program, and when memories are made larger, the access times slow down and power consumption and heat dissipation also becomes a problem.

The Cache Coherent non-Uniform Memory Access (ccNUMA) is one known method to scale coherent memory to multiple nodes, in this case, such as scaling cache coherence to multiple SoC's. Modern computer systems typically include a hierarchy of memory systems. For example, a multi-processor SoC might have an L0 and L1 private cache next to each processor, and a common share L2 cache per processor cluster. The L0 cache is typically the smallest, perhaps 16 to 256 kilobytes (KB), and runs at the fastest speed thereby consuming the most power. An L1 and L2 cache might be placed next to each processor unit. These L1 and L2 caches are the next smallest, perhaps 0.5 to 8 megabytes (MB), and run at the next fastest speed. An L2 cache, if implemented, might be placed next to each processor cluster. An L3 SoC cache, common to all the caching agents within the SoC, of size 16 MB would typically represent the last level of cache memory on the SoC.

A large main memory, typically implemented using one or more banks of DDR SDRAMs (double-data-rate synchronous dynamic random-access memories) is then typically provided per SoC. Beyond that, a solid-state drive (SSD) and/or hard disc drive (HDD) disc array provides mass storage at a slower speed than main memory, and a tape farm can even be provided to hold truly enormous amounts of data, accessible within seconds, minutes or hours. At each level moving further from the processor, there is typically a larger store running at a slower speed. For each level of storage, the level closer to the processor typically contains a proper subset of the data that is in the level further away (inclusion property). For example, in order to purge data in the main memory leaving that data in the disc storage, one must first purge all of the portions of that data that may reside in the L0, L1, L2, and/or L3 levels of cache. Conventionally, this may not lead to any performance problems, since the processor is finished with the data by the time that the main memory is purged.

However, as more processors and more caches are added to a system, there is a need to scale out to systems consisting of multiple SoC, and there can be more competition for scarce cache resources. It can also be beneficial to scale out coherence to handheld devices as this can e.g. simplify the coordination of data on server machines and a subset of that data on the handheld devices. There is a need to maintain coherence of data (i.e., ensuring that as data is modified, that all cached copies are timely and properly updated, ensuring consistency of all copies that are stored in various caches). Thus there is a need for improved methods and apparatus to improve system performance while also maintaining system integrity and cache coherence.

SUMMARY

In accordance with an aspect of the invention, network interface circuitry, forming a local node, is configured to couple a host computer and a network. The network interface circuitry comprises at least one processor configured to offload from the host computer at least a portion of communication protocol processing to accomplish at least one stateful communication connection between the host computer and a peer via the network and, further, to operate a cache coherence protocol to scale coherent memory to multiple nodes. The network interface circuitry further comprises at least one memory, wherein the memory is configured such that the processor may interact with the memory using an access procedure, to access a state according to an identifier corresponding to that state.

The processor is configured to operate the communication protocol processing offload at least in part according to communication connection states maintained in the memory, including accessing each communication connection state in the memory using the access procedure, to access that communication connection state in the memory according to an identifier corresponding to that communication connection state. The processor is further configured to operate the cache coherence protocol at least in part according to coherence states maintained in the memory, including accessing each coherence state in the memory using the access procedure, to access that coherence state in the memory according to an identifier corresponding to that coherence state.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Within this description, we refer to the following documents:

[1] The SGI Origin: A ccNUMA Highly Scalable Server, by James Laudon and Daniel Lenoski (1997); and

[2] Using Formal Verification/Analysis Methods on the Critical Path in System Design: A Case Study, by Ásgeir Th. Eiríksson1 and Ken L. McMillan (1995).

The inventor has realized that scaling coherent memory to multiple nodes may be implemented using a protocol offload NIC wherein, for example, the NIC offloads protocol processing at the network layer and below, from a host. The scaling employs mechanisms of the NIC that are optimized for protocol offload implementation, reusing parts of the protocol offload processing modules, and because of the reuse achieving an implementation that minimizes silicon area. In an example, a protocol offload NIC is coupled to an SoC node via a shared cache coherent network (CCN) and, and the protocol offload NIC implements a Cache Coherent non-Uniform Access (ccNUMA) controller within a node, that in turn is part of a ccNUMA cluster. A CCN here refers, for example, to a network with coherent agents where each agent is obligated to access memory and update memory content (data) according to a cache coherence protocol. See, for example, [1]. One such cache coherence protocol is the MESI protocol that utilizes Modified (M), Exclusive (E), Shared (S), and Invalid (I) state cache lines. The agents operate such that, at most, one agent can have a cache line cached in the M or E states, and each agent with a cache line in the S state is obligated to upgrade to an E or M state before modifying the data. When an agent requests an exclusive copy of the data, an agent with the cache line in the M state is obligated to respond with the modified data. Finally, an agent with a cache line in the M state is obligated to write the cache line back to memory when evicting the line from its cache.

Figure 1:
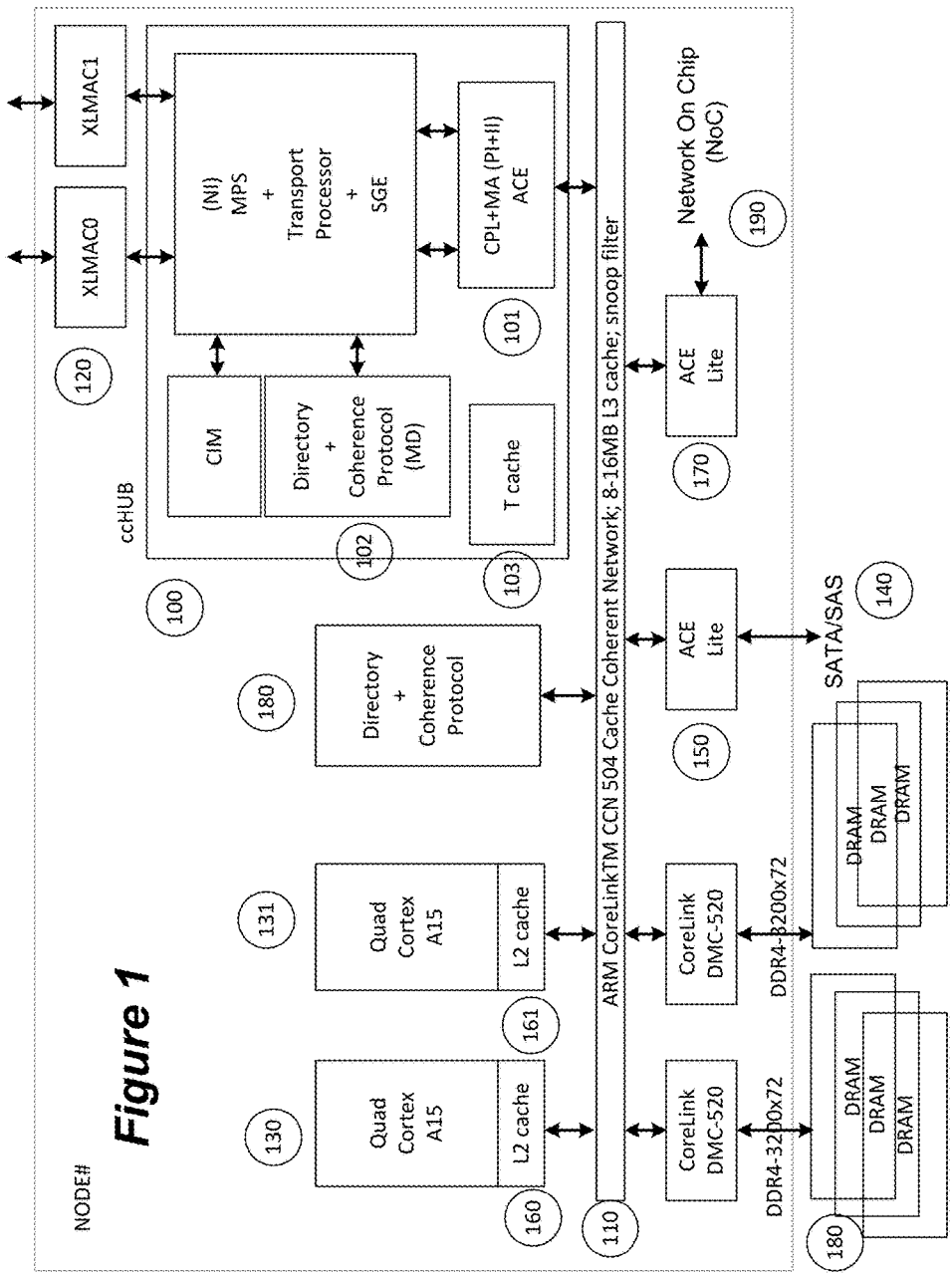
FIG. 1 is a block diagram illustrating an SoC node in a DSM system that integrates a directory based DSM controller with a protocol offload NIC.

Referring to FIG. 1, an offload NIC 100 is connected to a CCN 110 (in the example, an ARM CoreLink™ CCN) and an Ethernet fabric 120 via two 40GE Ethernet MAC. In place of Ethernet there could be IB, WiFi, 4G CDMA, etc. (Furthermore, protocol offload NICs are known. See, e.g., U.S. Pat. No. 8,155,001 assigned to Chelsio Communications, Inc.)

The node in this example includes two 4 processor ARM A15 clusters 130, 131 connected to the CCN, storage busses such as SATA/SAS 140 with ARM ACE-Lite compatible interface modules 150 connected to the CCN, and a Network on Chip (NOC) 190 connected via interface module 170 to the CCN. The CCN in this example implements a snooping coherence protocol such that when a coherent agent such as one of the processors within cluster 130, 131, the SAS/SATA 140, the NOC 190, or the NIC 100 issue a coherent read request (various "flavors" of read requests are possible), then any of the other agents that have a cached copy are obligated to respond with their copy of the data, if they have an M state copy, and optionally if they have it in the E state where the memory 180 can/could also respond with the data. When the agents have an S state copy, there is an option to either have one of the sharers respond with the data or to have the memory respond with the data. In the sharer option one of the shares can have been designated as the owner and that is the one that responds. If the request is for an exclusive copy of the data, the responder invalidates its copy of the data, and if the request is for a shared copy, the responder downgrades to an S state. In the case that no agent has a cached copy, the data it is fetched from the memory 180.

Each ccNUMA node has a node# that can be, for example, twelve bits to support 4096 distinct nodes. The memory addresses on the CCN are, for example, 64-bits wide with, for example, bits 59-48 representing the node number and the bottom 48 bits (47-0) representing the addresses within a node. When, for example, a processor within cluster 130 issues a read cached request to address A1 on node N1, then the address is stored in the memory 180 of the local node (the same SoC as the requesting processor) if the address bits 59-48, the node number portion, is equal to N1, the local node. Otherwise, the data is owned by a different ccNUMA node and the read request is processed by issuing a read request to the owning node using the ccNUMA controller subsystem within the NIC 100, which in this case sends a read request over the Ethernet fabric 120 to the owning ccNUMA node. The sending of the request and the response is accomplished using a dedicated TCP/IP offload connection from the requesting node to the owning node (other options than TCP/IP include e.g., using InfiniBand, RDMA over Converged Ethernet, iWARP RDMA over regular or Converged Ethernet or other network technology). Furthermore, failover processing at the TCP/IP layer may provide for high reliability communication of cache coherence protocol messages. One advantage of using the RDMA mode of protocol offload is that it enables bridging between the addresses used in the typical ccNUMA implementation, refer to these as physical addresses, and virtual addressing schemes used within the nodes. The RDMA mode of offload uses memory map tables, typically referred to as STAG to map the addresses used for sending and receiving. For the purposes of ccNUMA the STAG can be used as an indirection mechanism to map to/from virtual addresses from/to physical addresses. For example the address used in a write back of a cache line can be mapped e.g. by using a region identifier such as exists on the ARM AXI bus, to the physical address used by the ccNUMA cache coherence protocol. The address used in a read request can be mapped in a similar manner, and for the read response the physical address can be mapped back using the address region identifier. The mapping can support bridging between virtual address spaces and the physical addresses by employing an identifier for the process(es) using the virtual address space to select the STAG on send and receive. In the following we will describe the invention without the added RDMA level of address indirection but it is understood that the methods described can be extended by using the address indirection mechanism provided by RDMA.

We consider first the case where A1 has bits 59-48 equal to N1 the local node. (For example, the top some bits 63-60 may be either unused or reserved.) The coherent read request is issued on the CCN 110 and all the agents on the CCN are obligated to indicate if they have a cached copy of the cache line with physical memory address A1, in which case they are obligated to respond with a modified copy of the cached data. A cache line is typically 64B or 128B in length. The ccNUMA controller PI module 101 records the cached read request and, because the read is to a local address, forwards the request to the local MD controller 102. The ccNUMA controller module MD 102 within NIC 100 looks up the state of the cache line A1, and if it is cached by another node, the MD 102 will issue an invalidate/intervention request to the node/nodes that have a cached copy. If no other node has a cached copy, the MD module responds with an invalid cache line state I response through the PI module 101 to the CCN. A defer mechanism may be utilized when going off node because of the increased snoop response latency. If the directory of MD 102 indicates that another node has a cached copy, the MD 102 issues invalidate requests to the owning node(s) and gathers up the responses before responding with a snoop response to the CCN. In the case where a foreign node had a cached copy in the M state, the snoop response will contain the modified data and the data will be returned back on the CCN 110 and a separate coherence message will be sent to the MD 102 to update the state of the A1 cache line to the E exclusive in local node.

In the case where A1 has bits 59-48 not equal to N1, the address is owned by another ccNUMA node, and the snoop request is sent (perhaps masking of the snooping request to the local CCN agents) by the PI module within 100 out the network interface 120 to node=A[59:48].

The NIC 100 has two offloaded connections set up to each of the other nodes in the cluster. One connection carries request messages, and the other connection carries reply messages, and the two distinct connections are utilized to prevent deadlock in the ccNUMA fabric. See, e.g., [2]. When a message arrives on such a connection at a node, the message is switched to the directory controller MD that looks up the state of the cache line and sends out invalidate request if required to the nodes that have a cached copy of the address. In this case if the owning node has a cached copy, invalidates/interventions are issued through the PI interface to CCN 110 and the response is forwarded back to the directory MD 102. In this case, when other nodes have the cache line cached, the invalidates/interventions are issued through the dedicated TCP connections, one request connection to each destination node, each of which then responds on a response connection back to the owning node. There is also a dedicated response connection from each destination node to each requester node. The responses are switched to the MD that gather up the responses and when the intervention response, or all the invalidate response(s) have been received transfer the ownership to the requesting node and sends an acknowledge message to the requesting node that is forwarded to the PI that issues responds with the cache line. The data response is derived either from the memory at the owning node or from the modified copy within a cache.

Storage is supported in the ccNUMA fabric via block based e.g. iSCSI/iSER/FCoE initiators and targets, and file based e.g. NFS, SMBD clients and servers, that interact with the ccNUMA cache coherence protocol. As an example, a storage initiator read, from an IO device buffer into the coherent domain, results in any cached copies for the read address being invalidated, before the IO data is DMA written into the coherent domain. A storage initiator write, from the coherent domain to an IO device buffer, results in reading a cached copy of the cache line if one exists, or if none exists, reading the data from memory within the owning node of the address, and then the IO data is DMA read from the coherent domain. Finally, in the case of a storage initiator partial read, a partial DMA write, the II 101 module within the owning node first acquires an exclusive copy of the cache line, stores it in the local cache TCache 102, merges in the DMA write data, and then finally writes the whole cache line to CCN, where it is written either to memory 180 or into the L3 cache 110. The operation of the TCache is explained further in relation to FIG. 3 later in the text. The boundary of the cache coherence domain in the above example is for demonstration purposes only and other design options are possible, e.g. the boundary can be within the storage target itself, and the storage target in that case supports the ccNUMA cache coherent protocol natively. It is also possible to have the target simultaneously support networked storage via e.g. iSCSI and NFSoRDMA, and via the ccNUMA memory abstraction.

Figure 2:
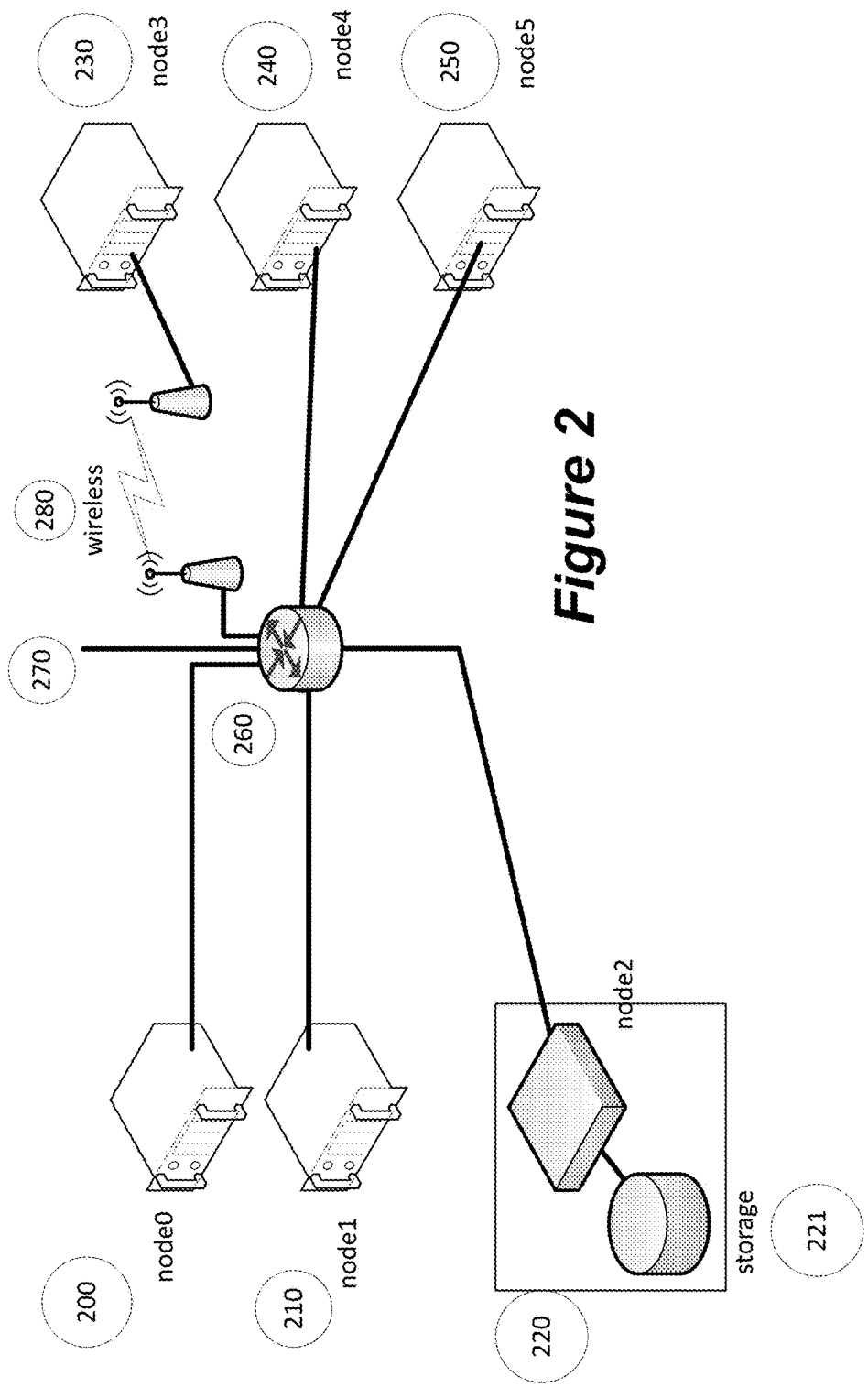
FIG. 2 is block diagram illustrating a cluster of SoC connected with the TCP protocol running over a wired and wireless IP network.

Refer now to FIG. 2, that shows a ccNUMA cluster with node0 to node5 (200-250), and storage 221 attached to node2 220 in addition to the NOC and processor cluster shown in FIG. 1. One or more of the nodes may be WiFi, 4G, etc. Each of the ccNUMA nodes is assigned a unique node number value, and assume as an example that the value assigned to each node corresponds to the numbering in FIG. 2, i.e. that node0 owns addresses with A[59:48]=0, that node1 owns all addresses with A[59:48]=1, and same convention for node2 to node5. The nodes are in general connected through one or more Ethernet switches and FIG. 2 has one switch 260, that in addition to ports connecting to each of the nodes has an uplink 270 to the outside of the ccNUMA cluster, e.g. that is connected to a top of rack switch, a core switch, etc.

The DSM cluster can have storage attached to one or more of the nodes and implement a storage target on those nodes using, e.g., block protocols iSCSI/FCoE or iSER, or file based targets that use SMBD or NFS, to make that storage accessible to the other nodes within the DSM cluster or accessible to outside the DSM cluster via the uplink 270. As an example, a SCSI write from node3 to the storage attached to node2, is issued as a read coherent value of a particular cached address A2. The RDSHU goes to the MD on the node2 if A2 is owned by node2, but it is otherwise routed to the owning node of A2, and the MD on that node uses the directory to look up where to access a cached copy if one exists. A SCSI read that is issued on node3 over an iSCSI/FCoE/iSER initiator on node3 to the corresponding target on node2, and turns into a write with invalidate WINV to address A3 when the data arrives on node3. The WINV to A3 is sent to the MD of the owning node and the write can proceed if the data is not cached by one of the cached agents within the different nodes, or the cached copy/copies need to be invalidated before the write occurs to A3.

Now refer back to FIG. 1. In addition to providing a ccNUMA controller, the situation can be handled where the cache line size of the CCN is less than the cache line size of ccNUMA fabric. When fabric returns a cache line, it will be the size of a fabric cache line. Only a portion of the cache line can be returned to CCN. The remainder must either be saved in a different storage mechanism, or discarded. (It is usually not possible to write the remaining data directly into processor cache.) Discarding the remaining data wastes a portion of memory bandwidth. In addition, if ccNUMA fabric is based on a directory-based coherence scheme, the node has no choice but to keep the cache line, because if the line was requested exclusively by processor 130 then, as far as the ccNUMA fabric is concerned, processor 130 now owns that entire cache line. And if ccNUMA controller discards half of the cache line and later has to do a write-back of the cache line to the system, it will need all of the cache line to do the write-back. That is a particular problem for a ccNUMA fabric having a directory-based cache coherency scheme.

In one embodiment, ccNUMA controller 100 forwards the requested partial cache line to processor 130 and stores the remainder in ccNUMA TCACHE cache 103. For example, if the cache line size of the requesting processor 130 is 64B and the cache line size of ccNUMA fabric 128B, one can store half the cache line in processor 130 while storing the remaining half in cache 103. The ccNUMA controller acts as a bridge in this case requesting the larger size from the fabric, caching the larger cache line within TCACHE, and returning the smaller size to the requester within the SoC. The agents caching entries from TCACHE are all within the SoC and, when evicting TCACHE entries, it is therefore sufficient to issue invalidates/interventions to the CCN. Various schemes may be used to determine what invalidates/interventions are required to be sent and those can be supported. For example the TCACHE might contain a bit vector e.g. 16-bits in the 64B/1 KB case to indicate which of the 16 64B addresses contained within a 1 KB cache line are cached within the SoC.

Cache coherence differences can also be an issue in fitting a processor 130 into an existing ccNUMA fabric. In one embodiment, transaction handler MD within bridge logic 102 includes a coherence bridging engine. Coherence bridging engine 102 understands the coherence protocol of both the ccNUMA fabric and of the processor 130 and serves to bridge between the two coherence protocols. In another embodiment, coherence bridging engine 102 serves as an intermediary between the cache protocol of ccNUMA fabric and the cache protocol of the processor 130.

In some embodiments of the method, the computer system further includes a snoop-based cache-coherence protocol for the L0, L1, and L2 cache levels and a directory-based cache coherence protocol for the L3 cache 180. The ccNUMA controller is integrated with this directory protocol in such a manner that the L3 cache 180 keeps track of caching within the SoC while the ccNUMA controller keeps track of sharing of addresses owned by this SoC node within other SoC nodes.

Some embodiments of the method further include maintaining a directory-based cache coherence for intra node coherence, replacing L3 cache 180 by the ccNUMA controller 102, in addition to maintaining inter node coherence.

In some embodiments, data is passed between the first cache 160 and a second cache 161 across a multi-processor network CCN. In some embodiments, data is passed between the first cache 160 and a second cache within the NoC 190. In some embodiments, the control circuitry maintains a directory-based cache coherence in the second cache level. It is to be understood that the above description is intended to be illustrative, and not restrictive.

Figure 3:
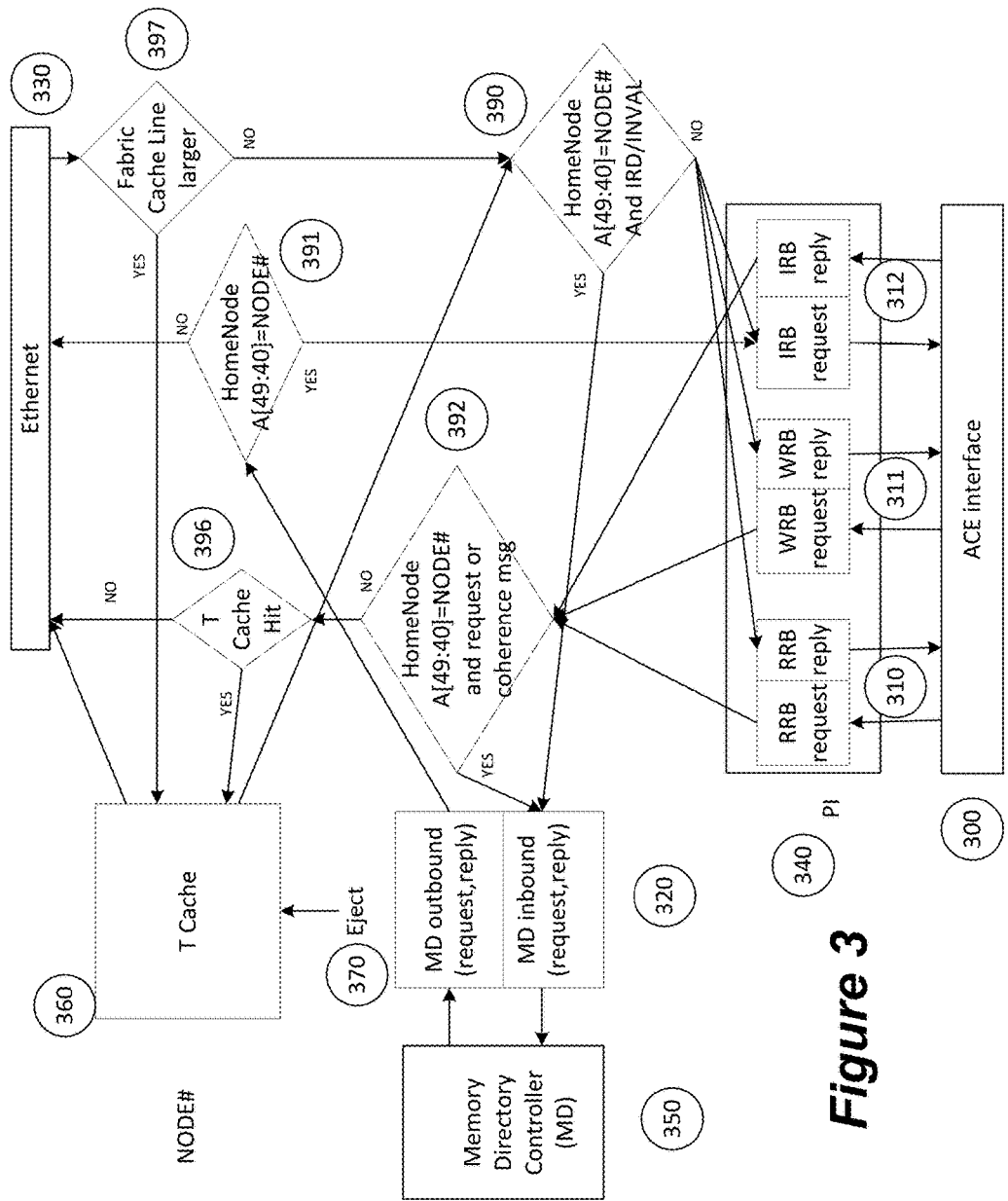
FIG. 3 is a block diagram illustrating the path traversed by a request emerging from a node, to a cache line that is either owned by the same node (initiator node), or to a cache line owned by a different node.

Refer now to FIG. 3, which presents an expanded detailed view of FIG. 1. Coherence messages are classified into request and reply messages. A read request from home node to an address owned by home node arriving from Read Request Buffer RRB 310 via ACE interface 300 is switched to the MD inbound request channel when there is space in the MD inbound request channel buffer. When there isn't space, the RRB holds the request until space is available. An inbound Read request from Ethernet 330 is switched to the MD inbound request channel buffer 320 when there is space in the buffer, otherwise the inbound request is dropped to maintain forward progress in the protocol processing pipeline. The switching to MD is accomplished by comparing the request address and the node number 390. The dropping occurs at the TCP protocol and the data is dropped by not acknowledging the received packets, and this in turn will cause re-transmission(s) by the TCP sender until the message(s) are successfully received and space is available in the inbound MD request buffer and the message can be acknowledged at the TCP protocol level. For DCB (Data Center Bridging) Ethernet that has multiple levels/classes of traffic, it would be possible to have the Ethernet inbound traffic in different classes and to pause the request traffic. The MD inbound reply traffic 320 would typically never be paused and is processed by the MD. To prevent the possibility of deadlock in the ccNUMA fabric, the cache coherence protocol messages are distinctly separated into request and reply messages, similar to what is described in Laudon & Lenoski, and the protocol designed such that the MD does not have inbound request to outbound request or inbound reply to outbound reply dependencies.

A read request from home node to an address owned by foreign node is processed by looking up the offloaded connection to the foreign node and sending the read message on that connection. The connection is identified by a TID and the request connections going to each of the destination nodes can for example be derived using an equation request_con_starting_req+destination_node#, where request_con_starting_req represent the TID for connection going to node0 from this node, and destination_node# is node number and is used to derive the TID for the other request connections. The same scheme can be used for each of the reply connections, i.e. con_starting_con+destination_node#. This allocation scheme is accomplished for example by reserving the requisite number of TID, N−1 request TID and N−1 reply TID, during ccNUMA cluster configuration, and during the TCP connection setup phase to allocate a TID corresponding to the assigned ccNUMA node number. The arriving messages on the request connections are switched to the MD 350 via the MD inbound request buffer when the message addresses correspond to the node number 390 but are switched to the PI 340 when they are not owned by the node. The messages going to the PI include read reply messages going to the RRB reply buffer 310, write back acknowledgement messages going to the WRB reply buffer 311, and intervention/invalidate requests going to the IRB request buffer 312. For the messages destined for the MD 350, the MD in turn looks up the state of the cache line and issues interventions/invalidates to the owning nodes if the cache line is shared or exclusively owned. The PI issues interventions/invalidates to CCN 300 via the ACE interface, and allocates an IRB request entry 312 to track the intervention/invalidate and sends back the responses 312 on the response connection back to the requester. When space is not available in the IRB request buffer 312 the message is dropped, is not acknowledged at the TCP level, leading to subsequent re-transmission by the sender until an IRB is available.

A write request from a caching agent connected to the CCN via ACE interface 300 allocates a WRB 311 entry to handle possible protocol message race conditions. It is for example possible that a different node is requesting the cache line being written back and that the WRB is allocated just before an IRB is allocated for the same cache line. The PI compares the addresses of the different WRB and IRB and responds accordingly, e.g. if the address is owned by this node, it allows the IRB to proceed, to read the data from the memory 180 (FIG. 1). If the address is not owned by the node an invalid response can be returned leading to the home node reading the data from its memory.

Figure 4:
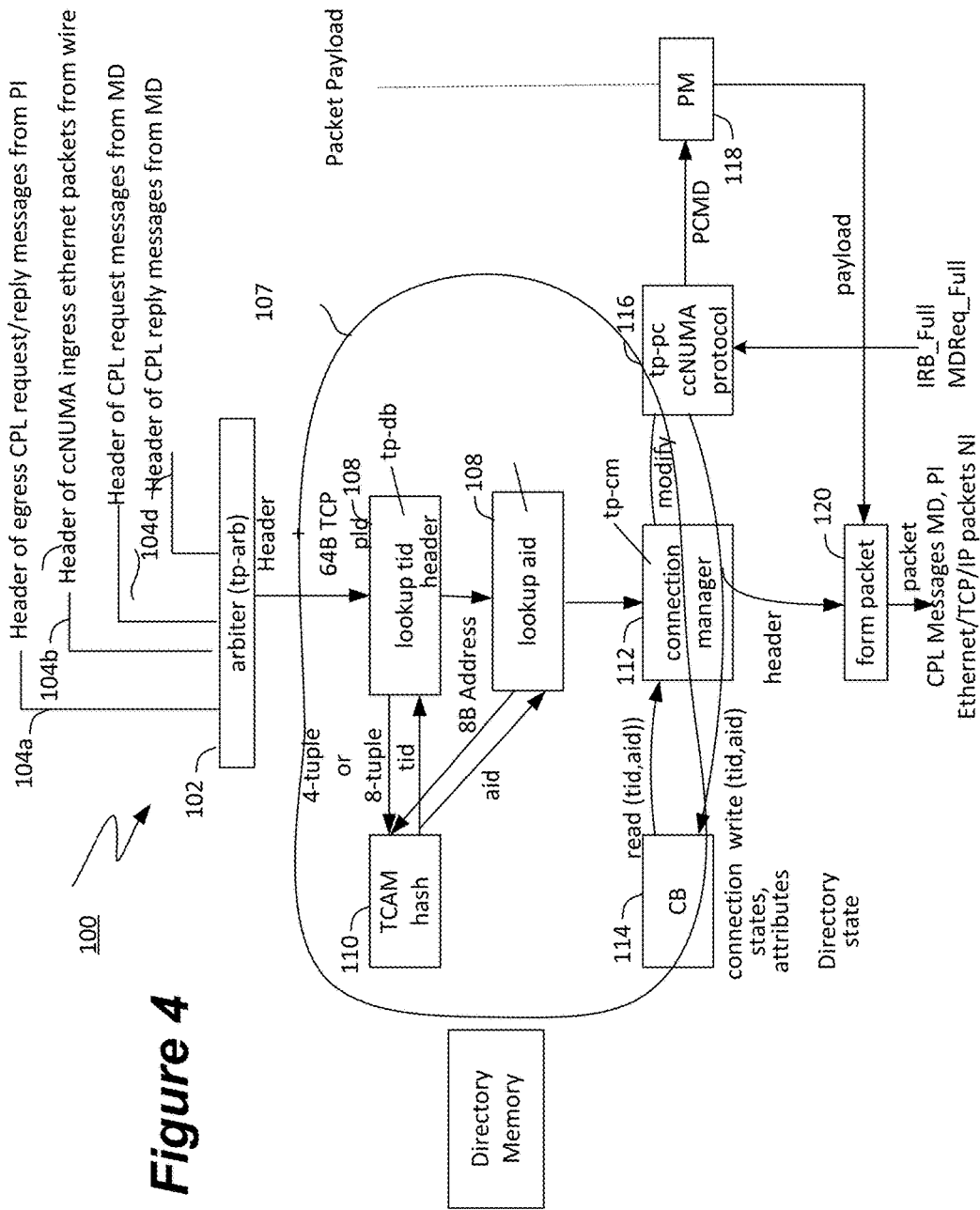
FIG. 4 is a block diagram illustrating the processing of a coherent message within the processing pipeline of the protocol offload NIC.

If the fabric cache line size is larger than the requested cache line size then the TCACHE 360 is used to store the larger cache line. For example when the request size is 64B while the fabric cache line size is 128B the requested 64B are returned to the requester while the whole 128B are stored in the TCache. The TCache typically keeps track of which portions of the cache line are cached within the cluster to be used when the cache line is ejected from the TCache. For example in this case 2-bits could be used to keep track of the 2 halves of the 128B cache line and if one bit or both are set when 128B cache line is ejected, the bit indicates that that half is still cached within the node, and an invalidate needs to be issued by the MD 350 and once the replies are received from CCN 300 the cache line can be written back to the owning node using the stored address of the 128B cache line. For read replies the larger cache line is written to TCache 360. For write-back of 64B cache line the cache line is written to TCache 360. For read requests from home node to foreign node it is checked if the cache line might be cached in TCache 360. For TCache management an eject 370 is supported that writes the cache line back to the owning memory within the owning node. This eviction is part of the cache coherence protocol and proceeds the same way as a processor cache writeback and needs to interact with new request that arrive during the eviction process. For example a read request might arrive during the eviction, etc. The eviction is required when the ccNUMA controller cache is full FIG. 1 103 or is close to filling up and when the directory state storage FIG. 4 114 is close to filling up. It might also be useful to trigger an eviction in the case of taking a node offline for maintenance or due to reconfiguration. An entry to be evicted from TCache or directory state storage can be selected based on an LRU (Least Recently Used) scheme or by randomly selecting an entry for eviction.

Figure 5:
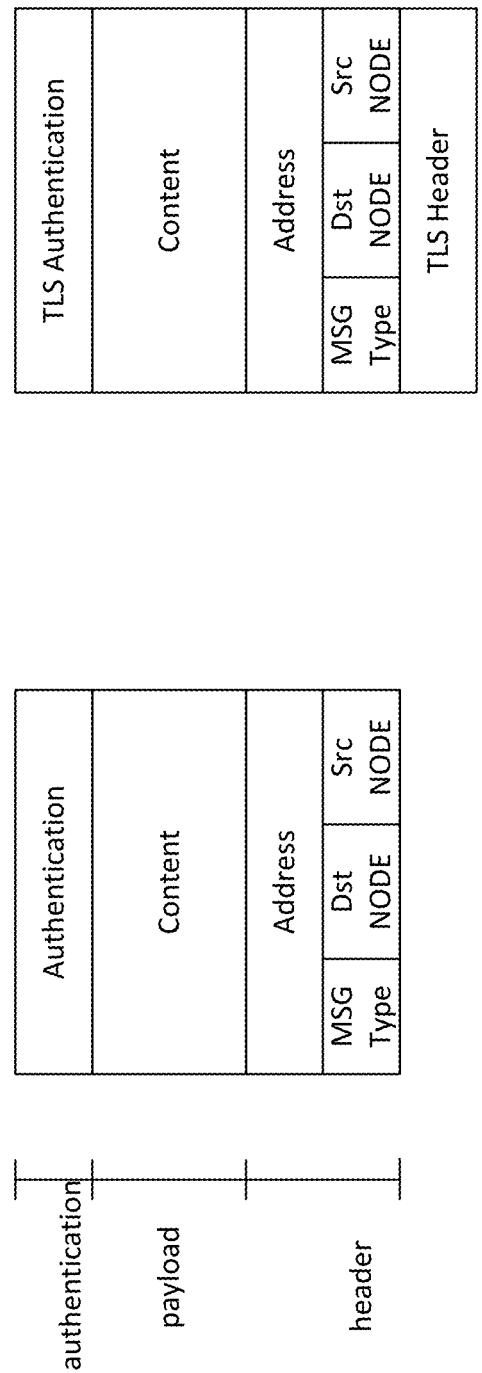
FIG. 5 is a block diagram illustrating the cache coherence message format.

Refer now to FIG. 5 that shows the format of ccNUMA messages that optionally have an authentication code and encryption protection. The authentication used is e.g. 256-bit and is computed with SHA-1. The ccNUMA messages are for example carried inside an Ethernet encapsulated TCP/IP packet. The authentication optionally enables out of order processing of the received messages, i.e. by re-computing the authentication code on receipt, and comparing the computed value with the value carried in the message, it can be determined that a TCP segment contains a coherence message aligned with the TCP segment, the TCP packets have not been resegmented, from sender to receiver, when going through middle boxes such as bridges and firewalls. Optionally the coherence messages can be encapsulated within the TLS protocol to authenticate and encrypt the coherence messages.

Refer now to FIG. 4 that presents a method to integrate the MD state lookup with the processing pipeline of an offload NIC. The cache line address A[49:6] in the case of 64B cache lines is looked up in associative manner using the TCAM/hash (See, e.g., U.S. Pat. No. 8,155,001), and if no entry is found, that means that the cache line is not shared and an INV can be returned as a snoop response from the ccNUMA controller. If an entry is found it points to a block of memory that stores the state of the cache line. The state is fetched to determine the state of the cache line and if it is required to send invalidate/interventions to node(s) that have a cached copy, that in turn respond, and MD eventually sending an acknowledge on the local CCN or to a requesting foreign node. As an example we can assume an implementation of the MD as described in [1] and [2]. The references [1] and [2] describe a directory implementation that has an entry for each cache line and the state is accessed (indexed) using parts of the cache line address, whereas the methods described in this filing describe an access method employing associative lookup using e.g. a TCAM/hash to access the directory state. We note that the indexed vs associative directory is an implementation choice compatible with the current filing. The indexed access requires more directory state storage and potentially enables lower access latency while the associative implementation in the typical case will require less storage while increasing access latency moderately. It is understood that the methods described in this filing can be modified in straightforward manner to employ the indexed directory access method, e.g. by storing the directory state in a dedicated memory and accessing the directory from that memory.

The ccNUMA coherence messages injected into the processing pipeline 100 are coherence messages arriving from other nodes over one of the Ethernet ports 104b, coherence messages from the PI module that are encapsulated within CPL headers, and reply 104d and request messages 104c issued by the local MD. ("CPL," in this instance, refers to "Chelsio Protocol Language" and these messages are messages passed between a NIC and its corresponding host processor.) It is also an option to separate the PI messages into request and reply messages for added flow control flexibility. The coherence messages arriving from the Ethernet include read requests e.g. RDEX destined to an address owned by this node, they include read reply messages from foreign nodes e.g. ESPEC to requesters within this node, they involve ownership transfer messages e.g. XFER to the local MD, and they include intervention requests to this node e.g. IRDEX. The coherence messages arriving from the PI can include ownership transfer messages e.g. XFER, read requests e.g. RDEX, and intervention responses e.g. IVACK. In each case, the appropriate address bits in ccNUMA coherence message FIG. 5 can be used to steer the messages to either the local MD or to foreign MD or PI via an offloaded TCP connection.

The messages are going to the local MD if their address matched the node number of the local node, but otherwise if the node number of the addresses doesn't match, the messages from the PI are going via an offloaded connection to a foreign node, and the inbound Ethernet/TCP/IP encapsulated messages are going to the local PI. For the outbound messages the PI and MD determine the tid of the outbound connection from the destination node number and look up the tid corresponding to that node number in a table that maps destination node number to tid. The table can e.g. be setup by firmware during the creation of the offloaded connection. The reply and requests packets have an address in the ccNUMA message header within the TCP payload. The CPL messages from the MD and PI contain a tid and an address, and the ingress ccNUMA messages arriving from Ethernet contain a 4-tuple and an address, and these are looked up in the TCAM hash 110, the connections are mapped to a location in the memory the tid that stores the state of the TCP connection and separately the ccNUMA message address is looked up and if found in the TCAM/hash is mapped to a memory index atid. If the address is not found, then that means that no node in the cluster has a shared copy of the cache line. For the egress messages from the PI to the local MD as determined by the address, the address is also looked up in the TCAM/hash to determine the sharing status, while the MD already knows the state for outbound messages MD and therefore doesn't need to look it up again. The tp-pc module processes the TCP state and takes into account buffer space of ingress messages from the Ethernet that are going to local MD. If these messages are going to cause the issuing of request and or reply messages by the MD there needs to be space in the corresponding outbound MD buffer. In the absence of such available space the ingress TCP segment will not be acknowledged leading to a later re-transmit of the ccNUMA message from the foreign node. For messages from the PI to the local MD it is possible to reserve space for messages it will issue in the outbound MD buffers, based on e.g. worst case assumptions, or the PI can use an offloaded TCP connection when sending to the local MD and in that case store the ccNUMA message in the TCP send buffer until the MD can accept the message. When the pipeline messages are destined to the local MD they are processed by the protocol table within tp-pc 116 taking into account the request and reply messages generated by the MD when deciding to acknowledge the TCP segment. If the ccNUMA address is foreign, it is forwarded to PI if there is sufficient space in the read reply buffer for replies and the intervention request buffer for requests. The typical RRB design reserves sufficient space to always be able to sink the reply when it arrives.

We have thus described, for example, scaling a coherent memory protocol to multiple nodes implemented using a protocol offload NIC wherein, for example, the NIC offloads protocol processing at the network layer and below, from a host. As described, the scaling employs mechanisms of the NIC that are optimized for protocol offload implementation, reusing parts of the protocol offload processing modules, and because of the reuse achieving advantages such as, in some implementations, minimizing silicon area.

What is claimed is:

1. Network interface circuitry, forming a local node, configured to couple a host computer and a network, the network interface circuitry comprising:
   a processing pipeline configured to offload from the host computer at least a portion of communication protocol processing, including data transfer processing of the communication protocol processing, to accomplish at least one stateful communication connection for the transfer of data between the host computer and a peer via the network and, further, to operate a cache coherence protocol to scale coherent memory to multiple nodes; and
   a memory, wherein the memory is configured such that the processing pipeline may interact with the memory using an access procedure, to access a state by presenting, to the memory, an identifier corresponding to the state based on a message received by the network interface circuitry, wherein the state comprises one of a communication connection state and a cache coherence state;
   wherein
   the processing pipeline is configured to operate the offloaded at least a portion of communication protocol processing at least in part according to communication connection states maintained in the memory, including accessing each communication connection state in the memory using the access procedure to access said each communication connection state in the memory according to an identifier corresponding to that communication connection state when the message received by the network interface circuitry relates to the data transfer processing of the communication protocol processing, and
   the processing pipeline is configured to operate the cache coherence protocol at least in part according to coherence states maintained in the memory, including accessing each coherence state in the memory using the access procedure when the message received by the network interface circuitry relates to cache coherence protocol processing, wherein accessing each cache coherence state in the memory using the access procedure comprises accessing said each coherence state in the memory according to an identifier corresponding to the accessed coherence state,
   whereby portions of the processing pipeline of the network interface circuitry are reusable for both data transfer processing of the communication protocol processing and cache coherence protocol processing.

2. The network interface circuitry of claim 1, wherein:
   the processing pipeline being configured to operate the cache coherence protocol at least in part according to coherence states maintained in the memory includes:
   for a cache line, using at least a portion of a cache line address as a key used in an associative lookup to determine an index into the memory;
   attempting to access a coherence state corresponding to the cache line address; and
   providing a message appropriate to the cache coherence protocol.

3. The network interface circuitry of claim 2, wherein:
   if the coherence state corresponding to the cache line address is not available in the memory, the processing pipeline operating the cache coherence protocol is configured to return a message indicating that the cache line is not shared.

4. The network interface circuitry of claim 2, wherein:
   if the coherence state corresponding to the cache line address is available in the memory, the processing pipeline operating the cache coherence protocol is configured to return a message that, according to the cache coherence protocol, is appropriate in the situation that the cache line is shared.

5. The network interface circuitry of claim 2, wherein:
   providing the message appropriate to the cache coherence protocol includes providing the message to a cache controller of the local node or to a cache controller of a remote node, depending on a node indication in a received cache coherence message in response to which the cache coherence state memory was accessed.

6. The network interface circuitry of claim 2, wherein:
   providing the message appropriate to the cache coherence protocol includes accessing a connection state in the memory corresponding to a communication connection between the local node and a remote node, and providing the message according to the communication protocol based at least in part on the accessed connection state.

7. The network interface circuitry of claim 1, wherein:
   the processing pipeline is configured to operate the offloaded at least a portion of communication protocol processing at least in part based on a coherence state for coherence protocol messages provided to the network interface circuitry of the local node from a remote node according to the communication protocol.

8. The network interface circuitry of claim 7, wherein:
   sending of at least one of cache coherence request and response messages is accomplished using at least one dedicated stateful network layer offload connection between the network interface circuitry and a node that is remote to the network interface circuitry.

9. The network interface circuitry of claim 8, wherein:
operation of the at least one dedicated stateful network layer offload connection is based at least in part on an amount of resources available for operation of the cache coherence protocol.

10. The network interface circuitry of claim 7, wherein:
the processing pipeline being configured to operate the offloaded at least a portion of communication protocol processing includes making a determination of whether resources are available in the network interface circuitry to accomplish particular cache coherence protocol processing and operating the offloaded at least a portion of communication protocol processing based on the determination.

11. The network interface circuitry of claim 10, wherein:
operating the at least a portion of communication protocol processing based on the determination includes not acknowledging communication protocol packets that indicate the particular cache coherence protocol processing.

12. The network interface circuitry of claim 7, wherein:
operating the offloaded at least a portion of communication protocol processing includes handling, within the offloaded at least a portion of communication protocol processing, communication protocol packets from a remote node including cache coherence request messages differently from communication protocol packets from the remote node including cache coherence reply messages.

13. The network interface circuitry of claim 1, wherein:
the offloaded at least a portion of communication protocol processing includes determining that, for each cache coherence message provided from the network interface circuitry to a remote node, that said provided cache coherence message is entirely contained within a single packet provided from the network interface circuitry to the remote node by the offloaded at least a portion of communication protocol processing.

14. The network interface circuitry of claim 1, wherein:
operating the cache coherence protocol includes authenticating cache coherence protocol messages, whereby cache coherence protocol messages provided out of order by the offloaded at least a portion of communication protocol processing may be processed.

15. The network interface circuitry of claim 1, wherein:
operating the offloaded at least a portion of communication protocol processing includes providing at least one stateful network layer connection for communication of cache coherence protocol messages from the network interface circuitry to at least one remote node.

16. The network interface circuitry of claim 15, wherein:
the offloaded at least a portion of communication protocol processing includes failover functionality, such that communication of cache coherence protocol messages is with reliability as provided by the failover functionality.

17. The network interface circuitry of claim 1, wherein:
when operating the cache coherence protocol by the processing pipeline includes determining that a message is required to be sent to from the network interface circuitry to a peer via the network, thereafter operating the data transfer processing of the communication protocol processing to send the message from the network interface circuitry to the peer via the network.

* * * * *